United States Patent [19]

Marchesi et al.

[11] Patent Number: 4,702,282
[45] Date of Patent: Oct. 27, 1987

[54] REINFORCED CONVENTIONAL CONCRETE PIPE HAVING AN EVENLY DISTRIBUTED STEEL WIRE REINFORCEMENT

[75] Inventors: Sergio Marchesi; Gino Fachin, both of Rome, Italy

[73] Assignee: Vianini Industria S.p.A., Rome, Italy

[21] Appl. No.: 894,804

[22] Filed: Aug. 8, 1986

Related U.S. Application Data

[62] Division of Ser. No. 755,376, Jul. 15, 1985, Pat. No. 4,633,568.

[30] Foreign Application Priority Data

Nov. 27, 1984 [IT] Italy ................. 49211 A/84

[51] Int. Cl.⁴ .................................... F16L 9/00
[52] U.S. Cl. ......................... 138/176; 138/DIG. 5
[58] Field of Search ............... 29/452, 458, 460; 242/7.22; 138/175, 176, DIG. 5; 156/173; 264/228

[56] References Cited

U.S. PATENT DOCUMENTS

| | | | |
|---|---|---|---|
| 2,375,921 | 5/1945 | Hirsch | 242/7.22 X |
| 2,569,612 | 10/1951 | Laurent | 138/176 X |
| 3,111,965 | 11/1963 | Hodge | 264/228 X |
| 3,136,036 | 6/1964 | Dobell | 29/452 X |
| 3,162,709 | 12/1964 | Davidson | 264/228 |
| 3,520,968 | 7/1970 | Kreston | 264/228 |
| 3,654,968 | 4/1972 | Mizuma | 138/176 |
| 3,758,940 | 9/1973 | Lamy | 29/460 |
| 3,928,104 | 12/1975 | Luckett et al. | 29/452 X |
| 3,969,812 | 7/1976 | Beck | 29/452 X |
| 3,982,565 | 9/1976 | Dida | 138/176 |

FOREIGN PATENT DOCUMENTS

1584844  12/1977  United Kingdom .

*Primary Examiner*—Charlie T. Moon
*Attorney, Agent, or Firm*—Browdy and Neimark

[57] ABSTRACT

A plain concrete pipe having an evenly distributed steel wire reinforcement is disclosed, said pipe being suitable for water piping and the like; this pipe being reinforced with a reinforcement constituted by thin wires evenly distributed and arranged in a circumferential pattern and a longitudinal pattern; a method is also disclosed for the manufacture of the pipe on an industrial scale in an efficient and economical manner (FIG. 3).

2 Claims, 7 Drawing Figures

REINFORCED CONVENTIONAL CONCRETE PIPE HAVING AN EVENLY DISTRIBUTED STEEL WIRE REINFORCEMENT

This is a division of application Ser. No. 755,376 filed July 15, 1985, now U.S. Pat. No. 4,633,568.

BACKGROUND OF THE INVENTION

1. Field of the Invention

The present invention relates to a new kind of pipe realized with conventional reinforced concrete having an evenly distributed steel wire reinforcement, as well as to a method for its manufacture on an industrial scale. Pipes realized with conventional reinforced concrete having an evenly distributed steel wire reinforcement (known as T.A.D. pipes) are articles of manufacture made with conventional reinforced concrete in which the reinforcement structure is extremely distributed, homogeneously arranged and constituted by steel wires having an extremely small diameter (0.5–1 millimeters). This structure allows the obtainment of an extremely high mechanical strength of the whole.

2. Description of the Prior Art

The manufacture and the characteristics of T.A.D. pipes are disclosed in British Pat. No. 1,584,844 in a detail manner.

In this prior patent, even if the technological problem of the manufacture of T.A.D. pipes has been resolved, there was still not resolved the problem of weaving bundles of wires from one to the other of the ends of the pipes in a continuous and automatic way, in order to realize rapidly and economically a longitudinal reinforcement of the pipes themselves.

As a matter of fact, the previous British patent describes clearly the difficulties connected with the set up of a longitudinal reinforcement, that was indeed expressely excluded, because even if the problem of the transversal strength or resistance to the burst of the pipe was resolved completely, the longitudinal strength or flexion strength of the pipe was relied upon bundles of wires spirally wound in an inclined manner with respect to the axis of the pipe, thus developing a reinforcement action both longitudinal and transversal or circumferential. As a matter of fact, the inclination determines a component of the strength in a longitudinal sense and another component in a transversal sense, so that the inclined reinforcement may, theoretically perform the function of giving strength in both the directions.

With this the problem of the automatic (and consequently rapid and economical) laying down of the circumferential reinforcement had to be considered as resolved. However, subsequent tests have brought in evidence noteworthy technological inconveniences, and serious limitations in the characteristics of the pipes. In particular the bundles of inclined circumferential wires are wound by means of a carriage that travels with a continuous to and fro movement, along the axis of the mandrel. The ratio between the travelling speed of the carriage and the rotational speed of the mandrel determines the inclination of the spiral formed bundle of wires. Clearly, at the end of each travel, i.e. in proximity of the ends of the mandrel, the carriage must gradually slow down to a stop, to stay still for a short time interval sufficient so that the mandrel makes at least half a turn, so that the wires are anchored in the concrete already projected on the mandrel itself, and then to start with a gradual acceleration the travel in the opposite sense. It derives therefrom that, in proximity of the ends of the pipes, the inclination of the spiral goes to zero and consequently the longitudinal component of the reinforcement vanishes. On the other hand the transversal reinforcement becomes excessive and needlessly encumbrant, up to the point that the compacting of the concrete is made difficult, and in that area it will be of low quality. Indeed, several experimental pipes manufactured in this way according to the British patent previously mentioned, gave origin to annular cracking near the ends, for the combined effect of the lack of longitudinal reinforcement and the scarce strength of the concrete.

It has been tried to obviate to this inconvenience with the introduction of supplementary reinforcement, constituted by ribbons of metal network wound on the ends of the pipes between the several layers of bundles of wires. This solution was however unsatisfactory because (apart from the further worsening of the characteristics of the concrete, made still more serious by the stiffness of the networks, that with their settling determine the creation of voids in the concrete material) it has reintroduced in the manufacture cycle a manual operation, to be performed several times during the manufacture, with the mandrel at a stop, so that the principle that had brought to the selection of a inclined spiral reinforcement choice is no more valid. The inclination of the reinforcement, in practice, cannot go beyond a certain angular value: this because to an increase of the inclination there corresponds an increase of the length of the mandrel occupied by the bundle of wires for each revolution of the mandrel itself, and consequently also an increase of the number of wires to be wound, and an increase of the width of the band of concrete to be projected immediately over the wires. These two parameters (number of wires and width of the band of concrete that it is possible to project in a uniform thickness and extremely thin) determine the maximum inclination of the spiral reinforcement that, in practice results of about 20° with respect to the directrix of the pipe.

Once that the maximum inclination has been fixed also the maximum contribution that the inclined spiral reinforcement may provide to the longitudinal strenght is fixed, strenght that in other terms becomes a fixed percentage of the transversal strenght.

It results therefrom that pipes to be utilized under low pressure, and consequently having a reduced transversal reinforcement, result poorly reinforced also in a longitudinal sense, and consequently they must be realized in short sections for limiting the flexure effects. On the other hand when elements having a greater lenght are to be produced, necessarily a reinforcement must be adopted that, in a transversal sense, is adequate for high pressures, with the consequence that pipes destined to lower pressures show a needless high strength.

These technological constraints will be better understood from the following practical example.

Let us consider a pipe having a dimeter of 600 millimeters, and having a wall thickness of 50 millimeters. For producing it in the commercially accepted lenght of 5 meters, it is necessary to adopt a longitudinal reinforcement (distributed on the whole annulus of the transversal section of the pipe) of at least 6 square centimeters of iron. This reinforcement, owing to the 20° inclination of the spiral, will correspond to a lenght of 74 centimeters of longitudinal section, so that for every linear meter there will be about 22.5 square centimeters of reinforcement, that correspond to a iron percentage of about 4.5% in volume with respect to the wall section. The composite material will have a strenght of about 150 kilograms/square centimeters and the pipe will fail at about 25 atmospheres. It is not possible to manufacture pipes having a diameter of 600 millimeters, and a lenght of 5 meters for lower pressures.

On the other hand if a pipe has to be manufactured having a diameter of 600 millimeters and a wall thickness of 50 millimeters, that fails under about 10 atmospheres, a strength of the composite material will have to be guaranteed of 60 kilograms/square centimeters and consequently an iron percentage of 1.5%, i.e. a reinforcement of 7.5 square centimeter for linear meter. The annulus resulting from the transvarsal section of the pipe will be traversed by only 2 square centimeters of iron useful to the longitudinal strength, and it will not be possible to manufacture the tube with a lenght greater than 3 meters so that it bears the flexure effects.

It is clear that (apart the technological difficulties and the economical burden connected with the production of pipes having different lengths for different pressures), the market would not accept neither pipes of different length nor pipes of the same length, but oversized in respect of the strength to internal pressure and consequently having a noncompetitive cost. It is clear therefore that the solution of the inclined spiral reinforcement from a practical standpoint is not prone to be transferred from the theoretical realm to the practical industrial one.

In Italian Pat. No. 545746 dating back to 1955, wherein a first attempt for producing a conventional reinforced concrete pipe on a rotating mandrel is disclosed, a transversal reinforcement was adopted constituted of steel rods that had to be placed by hand on the pipe. The reinforcement constituted of large diameter rods as disclosed in this patent, does not constitute in any way a distributed reinforcement in the sense meant in the patent (published Italian application No. 52836 A/76), because the strength provided by the rods results concentrated in discrete points in the wall of the pipe. Consequently such a solution, that corresponds to the teaching of the conventional art, is not applicable for a pipe having a distributed reinforcement in the sense meant by the present invention.

SUMMARY OF THE INVENTION

The problem of the distribution of a great number of thin wires in a longitudinal sense, in an automatic way, has been resolved by means of the present invention, overcoming in this way the inconveniences still present in the T.A.D. pipes of the prior art.

According to the present invention, a reinforced plain concrete pipe having an evenly distributed steel wire reinforcement, comprising a concrete wall obtained by high-speed projection of a homogeneous and concentrated jet of concrete on a forming mandrel rotating around a longitudinal axis and by the distribution, within the whole thickness of said wall being formed, of a circumferential reinforcement constituted of layers of continuous and thin steel wires helically wound, is provided, such pipe being characterized in that the inclination of the helix or spiral of wires for the circumferential reinforcement, with respect to the axis of the mandrel, is very small and comprised between 2° and 10°, while the diameter of the wires is comprised between 0.5 and 1 millimeters, and having further a longitudinal reinforcement constituted of thin steel wires parallel to the axis of the mandrel, that is homogeneously distributed in said wall of the tube, said longitudinal reinforcement wires being arranged in one or more subsequent layers of circumferential reinforcement wires and having a diameter comprised between 0.5 and 2 millimeters, the total density of steel wires with respect to the volume of the concrete being comprised between 1 and 5% in volume with respect to the section of the wall of the pipe.

It is also an object of the present invention, a method for manufacturing a pipe of the above identified kind, by projection of a high-speed jet of concentrated concrete and the concurrent winding of a first plurality of continuous circumferential thin wires over a rotating mandrel having two heads provided with anchorage means at their ends, this method comprising the steps of: winding said circumferential wires according to an helix having an inclination of 2° up to 10° with respect to the axis of the mandrel, up to obtain at least one complete winding of the mandrel; to stop the rotation of the mandrel, to fasten a second plurality of thin wires to a first head of the mandrel, onto said anchorage means; to pull said second plurality of wires in a first direction longitudinal with respect to the mandrel towards the second head of the mandrel itself; up to go beyond the anchorage means of said second head, in order to lay these wires on a longitudinal band on the pipe being formed; to rotate the mandrel through an angle corresponding to the arc of circumference of the mandrel covered by said band of laid down longitudinal wires, in order to bend the wires around said second anchorage means; to pull said second plurality of wires in a direction opposed to said first direction longitudinal to the mandrel, up to go beyond said anchorage means of the first head, in order to apply said wires on a second longitudinal band of the pipe being formed; to rotate said mandrel through a further angle equal to the first named angle, in order to bend said wires around said anchorage means of the first head; to repeat the operations of pulling said longitudinal wires and of rotating said mandrel, up to when on the whole surface of the pipe to be formed at least one layer of longitudinal wires has been laid down; to anchor and sever said longitudinal wires in register with the last anchorage means; and to resume the contemporaneous rotation of the mandrel, winding of circumferential wires and projection of concrete, so that the layer of longitudinal wires is comprised between two layers of winding of circumferential wires.

With the use of the present invention, pipes of the T.A.D. kind are obtained, that show the following features: two reinforcements, longitudinal and transversal, respectively, that are independent each other, each being correctly proportionated insofar as it is necessary, so that pipes can be manufactured having whatsoever pressure strength, all them having a standard length; the operations for distributing the longitudinal wires according to the method of the invention, being apt to be carried out automatically, with a machine (a machine for performing these operations being disclosed in another Italian patent application filed on the same date of this application by the same applicant);

the circumferential or transversal reinforcement, as a closely packed spiral, excludes the buildup of an excessive reinforcement at the ends of the pipes and the consequent leaning of concrete in that area; and the longitudinal reinforcement results uniform on the whole length of the article of manufacture, guaranteeing the strength in any point, the ends being included.

The T.A.D. pipe according to the present invention constitutes an appreciable improvement with respect to the pipes of the prior art, because with the particular combination of iron and concrete, a structural material is obtained that behaves unexpectedly in a new and different way with respect to the conventional reinforced concrete.

For better illustrating the advantages reached with the present invention, a description of the characteristics of the new material will be now given.

It is known that concrete, in front of a high compression strength, shows a poor tensile strength, a very limited range of elastic strain, and a fracturing of the fragile kind.

This behaviour is explained with the presence, in the matrix of concrete, of spontaneous cracks that develop already in the setting step. By subjecting a structure to tensile stress, on the limbs of the flaws stress concentrations are developed that overcome the limit of average strength of the material and cause the enlargement of the cracks themselves. This on its turn causes an increase of the stress at the limbs, so that the process is rapidly extended to the whole section under tensile stress, causing its sudden breakage. This behaviour limits the use of non reinforced concrete to structures subjected to compression stress alone.

The use of concrete in structures subjected also to tensile stress has been made possible by the reinforced concrete, in which the strength to tensile stress is entirely transferred to the reinforcement iron; the cracking of concrete in an area subjected to tensile stress is given as granted, and constitutes indeed a necessary condition so that the iron may reach adequate operational tensile stresses.

There are however structures subjected to tensile stress wherein the presence of crackings is not acceptable; as an example pipes destined to the transport of fluid under pressure; for the use of concrete in these structures, the present art has found no other remedy than to limit the tensile stresses within very reduced amounts, lower than those that cause the set up of the process of propajation of the sponteneous microcracks; it results therefrom a unrational use of the metal reinforcement, that in practice does not operate, and an applicative field very limited for the structures in question and beyond this range use is made commonly of more complex and costly concrete structures, such as the pre-stressed concrete, or other materials.

Recently many researches have been undertaken directed to widen the use fields of concrete subjected to tensile stress; some of these have given positive results, and they have given rise to the realization of new kinds of concrete material, such as the fiber reinforced concrete and the network reinforced concrete.

These materials represent attempts to exploit the tensile stress strength of the reinforcement iron already in the step of development of microcracks in the concrete, by dividing the reinforcement in a large number of metal elements having reduced dimensions, disperded into the mass of concrete material; in a structure reinforced in this manner, and subjected to tensile stress, the metal members that found themselves at the limbs of microcracks in the expansion phase do absorb the concentrations of tensile stress and consequently unload the concrete and block the expansion of the cracks themselves; with the increase of the loading, the expansion phenomenon is triggered on new existing microcracks, or causes new ones to develop, that tend to become larger up to when these also are blocked by the presence of reinforcement elements. This process may be repeating itself up to the involvement of the whole structure under tensile stress, and then it may be again reproduced several times on already blocked microcracks, with a gradual progressive increase of the expansion of the cracks and increase of the tensile stress of the metal members placed in the same interaction area so that the collapse of the structure is reached, with the formation of a macroscopic cracking, because of plastic elongation or breakage of the armature in a general section. Such last phase occurs, clearly, for tensile stresses far greater than the typical ones of non-reinforced concrete or concrete reinforced in a conventional manner and with very high apparent strains.

Considering that the presence of microcracks, in any expansion phase, does not jeopardise in any way the operativeness of the structure (the presence of microcracks being, as stated before, an intrinsic characteristic of concrete), it will be easily understood how much the use of reinforcements constituted of evenly distributed steel wire may be attractive for a better exploitation of the concrete material, particularly for structures under tensile stress as the abovementioned pipes under pressure. This notwithstanding, neither composites of fiber-concrete nor iron-concrete, have had in the field of pipings an appreciable widespread use, at it is occurred on the contrary for other kinds of structures; this is due to the fact that both the fiber-concrete (prepared with randomly arranged metal elements), and the iron-concrete (prepared with metal networks) provide a general increase of strength and deformability of the concrete, equal in any direction, and this is unrational and uneconomical for structures like pipes, that are, on the contrary, stressed only in two well determined directions (in the transversal sense and in the longitudinal sense), directions in which clearly only a minimum proportion of diffuse reinforcements do operate.

The composite material constituting the resistant wall of the T.A.D. pipes according to the present invention represents an optimization of concrete, with distributed reinforcement, specifically designed and finalized to the obtainment of the effect of stoppage and dispersion of the microcracks, as above, according to precise preferential directions, that obviously are those in which the tensile stresses do appear in pipes subjected to internal pressure and to external loads, imposed by the terrain and accidental loads.

The material according to the present invention is constituted of a fine-grained concrete matrix, with a high cement percentage and a reduced amount of water, wherein two pluralities of small-diameter metal wires are orderly arranged, a first one in a transversal sense constituted by continuous wires helically wound with a very narrow pitch, the other in a longitudinal sense is constituted of continuous wires weaved between the ends of the tubular structure; both these pluralities being characterized in that they may comprise any number of wires, having whatsoever (anyhow smaller than 2 millimeters), arranged with any inter-axial or mutual distance, (anyhow in the order of a few millimeters) absolutely even spaced.

The new material according to the invention differentiates itself from the conventional reinforced concrete, with which it has in common the advantage of the metal reinforcement placed in the desired directions and positions, because the evenly distributed steel wire reinforcement gives origin to the effect of stoppage and dispersion of the microcracks, while the typical reinforcements of the conventional reinforced concrete, constituted of few large elements appreciably spaced each other, cannot prevent the formation of microcracks, that limit greatly the possibilities of use of the material, it is also differentiated from the fiber-reinforced or network-reinforced concrete, with which it has in common the effect of stoppage and dispersion of the microcracks because the greater strength and deformability obtained are precisely finalized, through the precise arrangement of the reinforcements, to the containment of the design stresses, while fibers and networks provide a general improvement in these characteristics, that may be only with difficulty exploited in an economical and rational manner.

Moreover the regularity and uniformity of distribution of the evenly distributed steel wire reinforcement that may be obtained with the mechanical positioning of the reinforcement itself (like the one performed in the manufacture of T.A.D. pipes), determine an exact relationship between the quantity of metal reinforcement and the mechanical characteristics of the composite material thus obtained, and an exceptional uniformity of said characteristics, with a deviation (of the values of strength and deformability) much lower than the one that may be obtained both with the discrete reinforcement, that does not affect the random build up of the cracks, and with those constituted of fibers, in which the tensile stresses triggering the cracks and the collapse of the structure, even if they are high, are foreseeable only with difficulty because they are conditioned by the random arrangement of the fibers in the concrete mass.

In the material according to the invention, on the contrary, the regularity and uniformity of distribution of the reinforcement allow to obtain in the whole stressed structure, a uniform distribution of the strains and of the stresses, and consequently the maximum possible number of microcracks, of the least possible magnitude in connection with the imposed strain.

The extremely reduced magnitude of the cracks gives origin to another peculiar feature of the composite material constituting the wall of T.A.D. pipes; let us consider that in reinforced structures of the conventional shape and destined to the containment of fluids under pressure, the build-up of one or a few macroscopic cracks entails the spill of water in a very appreciable quantity and in a violent manner, with destructive effects on the limbs of the structures, such as to cause the immediate fall of the pressure of the fluid therein contained and consequently the stop of the operativeness of the structure.

In the material according to the invention, on the contrary, when the applied tensile stresses reach values so as to cause the extension of the microcracks to the whole thickness of the wall, the unavoidable passage of water through these cracks, of a very reduced width, is of a very limited magnitude and assumes the form of a slow percolation that appears on the external surface of the wall as traces of humidity. Destructive effects do not appear and the pressure of the fluid, and consequently the operativeness of the structure, are integrally maintained. Moreover the slow passage of water in the microcracks reactivates the hydration of the cement bond agent contained in the concrete matrix; the hydration products (of a nature completely identical to those constituting the matrix itself) do seal rapidly the microcrack and block the spill of water, so that the perfect integrity of the wall is restored.

This hydration and self-sealing process is favoured and accelerated by the presence in the material in question of a deliberate excess of bonding agent, and a deliberate reduced amount of water in the mix, these conditions assuring the presence in the matrix of concrete of a quantity of non used bonding agent when the concrete sets; it results therefrom that the self-sealing action, and consequently the restore of the integrity of the wall, occur in an extremely reduced time, that is neglectable to the end of the operativeness of the structure.

In view of the fact, as abovesaid, that with the increase of the applied stresses the existing microcrack do not enlarge, but new ones are formed with a minimum width, the above described process is reproduced in the new microcracks, so that the operativeness range of the wall, to the end of the containment of the fluid under pressure, may be extended up to the last stage of collapse of the structure itself for failure of the metal reinforcement.

The use of a material capable of developing the above described process renders the T.A.D. pipe the only reinforced or pre-stressed concrete pipe that, (in the absence of a continuous metal envelope) is able to maintain unaltered its operativeness up to the moment of failure of the reinforcement.

The material according to the invention is therefore capable of:

- increasing appreciably the strength and apparent deformability of concrete under tensile stress (in practice up to five times those of conventional reinforced concrete), through the process of stop and dispersion of the microcracks, with a consequent better exploitation of the strength of the metal reinforcement;
- directing this increase of strength in the desired directions, with a rational and economical utilization of the reinforcement itself;
- adjusting such increase of strength with a precise reference to the performances requested each time to the material;
- guaranteeing the uniformity of said strength in any point of the structure and consequently the widest diffusion of the microcracks, with the least possible magnitude of each single microcrack.

In the specific case of structures containing fluid under pressure:

- once the limit of strength of the concrete (above indicated) is overcome, so as to determine the build up of through cracks, to exploit the reduced width of the microcracks for activating the hydration process of the cement in order to seal the microcracks themselves;
- in correspondence with a further increase of the tensile stress, to repeat the process on the new through microcrack that are being built up, up to involve the whole structure under tensile stress, and then also on those already formed and self-sealed when they are again opened, by exploiting the circumstance that the width of the cracks to be sealed is always very reduced, since the cracks are already partially sealed;
- to develop this process up to tensile stresses so high to determine the failure of the metallic armature, this assuring the complete exploitation of the strength of the reinforcement itself and extends the operativeness range of the structure up to tensile stresses and strains at least double than the above indicated strength limit of the concrete, and therefore, in practice, up to ten times the characteristic limits of conventional reinforced concrete.

DESCRIPTION OF THE DRAWINGS

The present invention will be described more into detail with reference to the attached drawings, wherein.

DETAILED DESCRIPTION OF THE INVENTION

Figure 1:
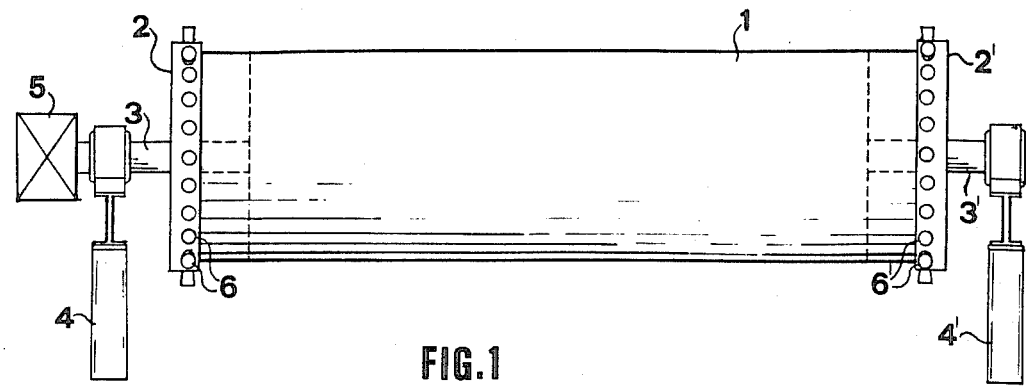
FIG. 1 is a schematical view of the mandrel for the manufacture of a T.A.D. pipe.

Before beginning with the detailed description of the invention, let us recall briefly the characteristics of the T.A.D. pipes that differentiate these pipes from the already known pipes. It is known that concrete pipes designed for pressurized conduits belong to two distinct classes:

(a) pipes in conventional reinforced concrete
(b) pipes in pre-stressed reinforced concrete.

The first ones, utilized in a range of relatively moderated pressures (for example, for diameters around one meter, not more than 5-6 atmospheres) comprise a concrete wall having therein inserted transversal and longitudinal reinforcement made of iron rods, having a relatively large diameter, are produced according to different technologies (centrifugation associated with vibration or rolling, casting in vibrating vertical molds, etc.).

The second ones, utilized in a range of pressures greater than those typical for conventional reinforced concrete (and therefore from 5-6 atmospheres up to a maximum of about 20 atmospheres) normally comprise a core tube, produced according to one of the technologies used for conventional reinforced concrete, whereon a spiral of high strength steel is wound under tensile stress; the spiral is then protected with a coating of cement.

T.A.D. pipes are substantially pipes in conventional reinforced concrete that can withstand the high pressures to which the pre-stressed reinforced concrete pipes are destined. With respect to these latter, the T.A.D. pipes show the following relevant differences in the field of reinforced concrete technology:

(a) the reinforcement is constituted of thin wires (having a diameter smaller than 2 millimeters) continuous in the whole wall thickness of the pipe, i.e. each wire goes from one to the other end of the pipe according to concentric helices, without interruption;

(b) the wires are not stretched, contrary to the reinforcement of pre-stressed reinforced concrete;

(c) the metallic reinforcement is intimately and tightly diffused in the concrete matrix, contrary to the reinforcement of conventional reinforced concrete and of pre-stressed reinforced concrete wherein the iron is concentrated in the, relatively large, areas of the reinforcement iron members.

The pipe is obtained by projecting under high speed (more than 25 meters/second) a premium concrete (a small granulometry, a high cement percentage, a very low water/cement ratio), with a mechanical process with counter-rotating rolls, on a mandrel rotating around its horizontal axis.

The concrete mix is constituted of inert materials up to 3 millimeters, washed and deprived of powders, that are a mixture of quarry and stone crusher products. The proportion of ingredients is around 600-700 Kg/m³ of cement, with a water/cement ratio smaller than 0.3.

A high strength concrete is obtained having the following characteristics:
- pure tensile stress: $\sigma_t = 60$ Kg/cm²
- tensile stress for flexion: $\sigma_f = 90$ Kg/cm²
- compression stress on a cube: $\sigma_c = 650$ Kg/cm²
- elastic modulus under tensile stress, for a tensile stress up to 0.7 $\sigma_t$: $E_t = 350.000$ Kg/cm²

The reinforcement is constituted, as an example, of smooth steel wire having $$\sigma_a \geq 8.000 \text{ Kg/cm}^2$$

The material defined as conventional reinforced concrete having an evenly distributed steel wire reinforcement constitutes therefore, from the technological standpoint, a new material that provides clearly higher performances with a clearly lower manufacturing cost.

Indeed the apparatus necessary for the manufacture of T.A.D. pipes is largely less costly, simpler and faster with respect to the apparatus necessary for the manufacture of reinforced concrete pipes either of the ordinary type or the pre-stressed one.

DESCRIPTION OF THE PREFERRED EMBODIMENTS

In FIG. 1, there is shown a metal mandrel 1 having at its ends two heads 2, 2' provided with shaft 3, 3' rotatably borne by bearings 4, 4'. The head 3 is connected to a motor 5 for the rotation of the mandrel 1 and of the heads 2, 2' around the axis passing through the shafts 3, 3'. The heads 2, 2' are provided with anchorage means 6, 6' that are used for the laying-down of the longitudinal wires as it will be described hereinafter.

For the manufacture of a T.A.D. pipe on the mandrel 1 there is applied a first layer of concrete by means of a projection apparatus indicated in 8 that projects on the mandrel a jet of coherent concrete 9, under high speed and having special granulometry and humidity contents characteristics. In the shown exemplary embodiment, it is intended in the figures that the mandrel rotates around its own axis, that the mandrel is stationary with respect to its longitudinal direction and that the projection apparatus travels along the mandrel in the two senses, in order to distribute the concrete on the mandrel in a circumferential sense because of the rotation of the mandrel and in a longitudinal sense because of the displacement of the apparatus 8.

Figure 2:
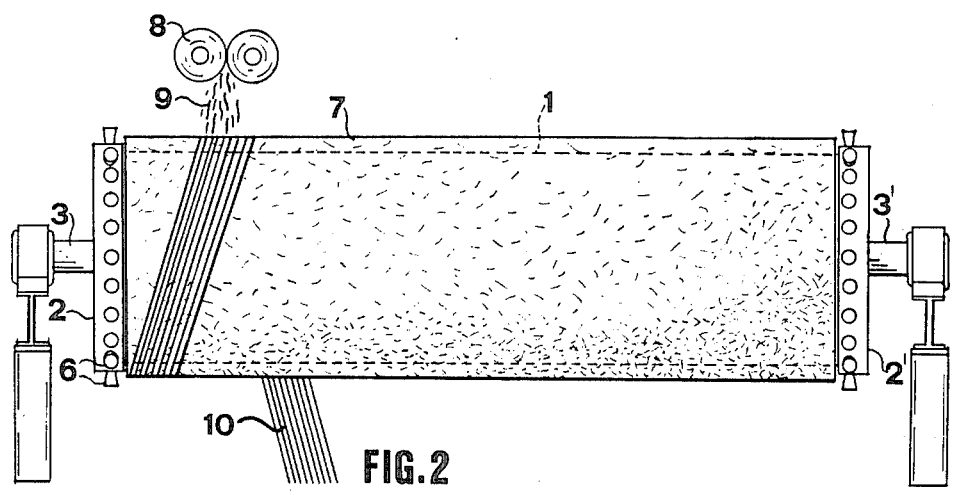
FIG. 2 shows the operation for winding the circumferential wires, and the projection of concrete.

When the first layer 7 of concrete has been deposited on the mandrel 1, the winding of circumferential wires is started (FIG. 2). The wires are wound according to the technics disclosed in British Pat. No. 1,584,844 by fastening a bundle of wires 10 to one end of the pipe being formed on the mandrel 1, which with its rotation will entrain the bundle 10 of wires that is unwound from coils placed on a carriage that travels in the longitudinal direction of the mandrel. When the carriage has performed a full stroke in front of the mandrel, a layer of bundles of wires 10 will be laid-down over the layer 7.

At the same time of the winding of circumferential wires 10, the projection of concrete is performed by means of the apparatus 8 so that the wires just laid-down on the fresh concrete of the layer 7 of concrete are immediately covered and inglobated in the concrete matrix. At the end of a number of passages a certain thickness of the pipe wall will be formed, wall that is reinforced with the circumferential wires 10.

Now one may proceed with the laying-down of a reinforcement layer of longitudinal wires for the manufacture of a T.A.D. pipe according to the present invention.

The rotation of the mandrel is stopped, without cutting the wires 10 constituting the circumferential reinforcement, in order to maintain valid the continuity condition of the circumferential reinforcement wires.

Figure 3:
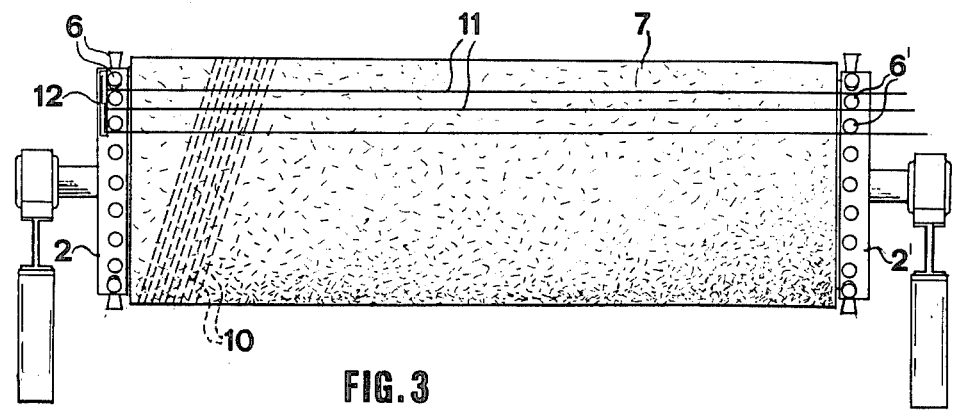
FIG. 3 shows the application of the longitudinal wires.

As it can be seen in FIG. 3, a bundle of wires 11 of longitudinal reinforcement is laid-down by anchoring the ends of the wires 11 to the anchorage means 6 of the heading 2 (or the heading 2') for instance by fastening said wires 11 to a iron bar 12 that acts as a constraint between the wires 11 that are stretched towards the right (looking FIG. 3) and the anchorage means 6.

The anchorage means 6 may be studs or hooks that protrude radially from the headings of the mandrel. The wires 11 are stretched by a machine and are brought towards the opposite heading 2' and made to pass through the anchorage means 6' of this head. In FIG. 3 and the following figures only three or four wires 11 have been represented, but it is clear that the anchorage means 6, 6' may be arranged in a more tightly packed way on the heads 2 and 2' and that the wires 11 may be laid-down with one "pass" may also be a large number, for instance six, a dozen or more.

Figure 4:
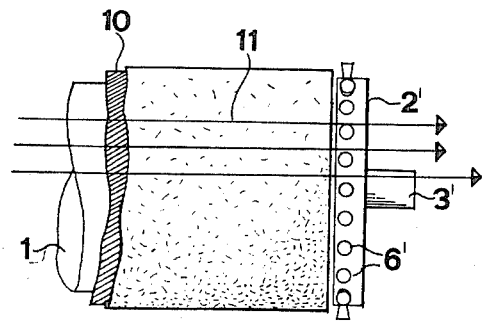
FIGS. 4, 5, and 6 show the several steps for the laying down of the longitudinal wires.

FIG. 4 shows the arrangement of the longitudinal wires in a manner corresponding to the representation of FIG. 3.

Figure 5:
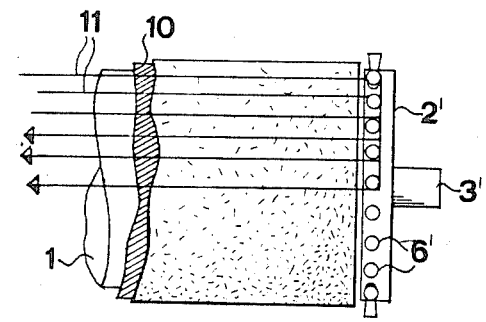

According to the method of the invention, when the wires 11 have gone beyond the anchorage means 6' of the head 2', the mandrel is rotated through an angle more or less corresponding to the arcle of circle covered by the bundle of wires 11, while the wires 11 themselves are kept stationary with respect to the mandrel. In this way, as it is shown in FIG. 5, the wires 11 will be bent around the anchorage means 6', assuring the fastening of the bundle of wires previously laid-down and subsequently the bundle of wires is stretched in a direction opposite to the previous one, and in this way the ends of the wires of the bundle will be anchored on the anchorage means 6'.

Figure 6:
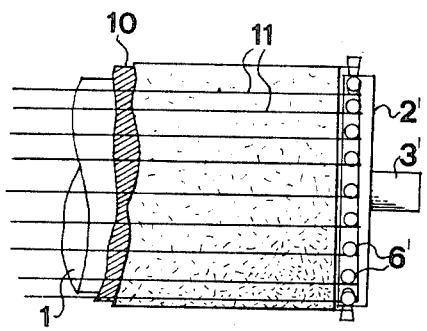

These operations are repeated up to cover the whole surface of the pipe being formed with a layer of longitudinal reinforcement wires, as it is shown schematically in FIG. 6. Obviously also a plurality of layers of wires may be laid-down, each single wire in the layer being continuous in the whole layer.

When this operation has come to an end, the wires 11 of the last pass are severed in correspondence of a head and anchored to the respective anchorage means.

Figure 7:
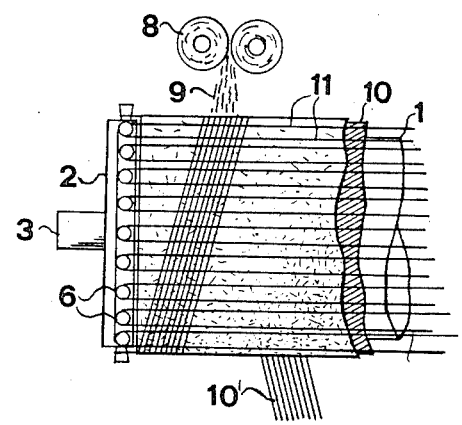
FIG. 7 shows the subsequent operation of resumption of the winding of the circumferential wires and the projection of concrete.

From this point the formation of the wall of the pipe continues with the winding of the bundle of circumferential wires indicated with 10' in FIG. 7 and the contemporaneous projection of concrete 9 from the apparatus 8, resuming the rotation of the mandrel 1. In this way the longitudinal wires 11 previously laid down are banded by the new layer of circumferential wires 10' and by the mass of projected concrete. The succession of operations may be repeated at will, up to obtain the desired wall thickness with the desired amount of longitudinal and circumferential reinforcement.

It may be remarked that the method for laying-down the longitudinal wires according to the invention may be realized in an automatic way, making thus completely automatic the manufacture of the T.A.D. pipe. A machine for performing this method is described in another patent applied for on the same date of the present application by the same applicant.

It should also be remarked that by the method of the present invention, the helix inclination of the circumferential reinforcement may be selected at will and preferably will be a very small one comprised between 2° and 10° with respect to the axis of the mandrel.

It appears therefore resolved in a complete manner the problem of producing pipes in conventional reinforced concrete with evenly distributed steel wire reinforcement provided with a circumferential reinforcement and a longitudinal reinforcement in the desired and suitable amount for providing the article of manufacture with the required strength.

It is obvious that the embodiment of the present invention may be subjected to changes that do not depart from the scope and spirit of the same.

What is claimed is:

1. In a reinforced concrete pipe having an evenly distributed steel wire reinforcement, the pipe having a concrete wall obtained by projecting at high speed a concentrated and homogeneous jet of concrete on a forming mandrel rotating around a longitudinal axis, and by distributing within the thickness of the wall a circumferential reinforcement comprising layers of continuous steel wires helically wound, the improvement comprising:

inclining the helix of the circumferential reinforcement wires with respect to the axis of the mandrel from 2° to 10°, the diameter of these wires being from 0.1 to 1 millimeter, providing a longitudinal reinforcement comprising steel tensioned wires having a diameter of from 0.5 to 2 millimeters, parallel to the axis of the mandrel and distributed homogeneously in the pipe wall, the longitudinal reinforcement tensioned wires being arranged in at least one layer between two helical layers of circumferential reinforcement wires.

2. The reinforced concrete pipe of claim 1 wherein the total density of steel wires with respect to the concrete volume ranges from about 1% to about 5% with respect to a section of the wall of the pipe.

* * * * *